United States Patent [19]

Kuhr

[11] Patent Number: 4,596,150
[45] Date of Patent: Jun. 24, 1986

[54] CONTACT-FREE, MAGNETIC, STRESS AND TEMPERATURE SENSOR

[75] Inventor: George A. Kuhr, Canoga Park, Calif.

[73] Assignee: Rockwell International Corporation, El Segundo, Calif.

[21] Appl. No.: 714,293

[22] Filed: Mar. 21, 1985

[51] Int. Cl.⁴ .......................... G01B 7/24; G01K 7/36; G01L 3/10

[52] U.S. Cl. .................................. 73/779; 73/862.36; 324/209; 374/176

[58] Field of Search .............. 73/DIG. 2, 779, 862.36, 73/862.69; 324/201, 209; 374/176, 177

[56] References Cited

U.S. PATENT DOCUMENTS 3,427,872 2/1969 Leep et al. .
3,783,370 1/1974 Birdwell et al. .
4,416,161 11/1983 Barkhoudarian .
4,523,482 6/1985 Barkhoudarian ................ 73/862.36

FOREIGN PATENT DOCUMENTS 1900194 1/1969 Fed. Rep. of Germany .

OTHER PUBLICATIONS

R. L. Pasley, "Barkhausen Effect—An Indication of Stress", Materials Evaluation, vol. 28, No. 7, 7/1970, pp. 157–161.
L. P. Karjalainen et al., "Influence of Tensile and Cyclic Loading Upon Barkhausen Noise in a Mold Steel", Materials Evaluation, 8/1979, pp. 45–51.
O. Sundstrom et al., "The Use of Barkhausen Noise Analysis in Nondestructive Testing", Materials Evaluation, 2/1979, pp. 51–56.

Primary Examiner—Charles A. Ruehl
Attorney, Agent, or Firm—H. Fredrick Hamann; Harry B. Field; Lawrence N. Ginsberg

[57] ABSTRACT

A method and apparatus for contact-free measurements of stress, temperature, torque, or other physical conditions which affect the magnetic properties of a non-ferromagnetic test object 10. The non-contacting magnetic sensor detects the large Barkhausen effect. Magnetic layers 12,14 of thin magnetic material are formed on surface 16 of test object 10. An easy axis of magnetization is formed on the magnetic layers 12,14 making them susceptible to the large Barkhausen effect. A physical condition, such as stress 17,17', is applied to test object 10 and magnetic field 18 is generated by source 19. Magnetic field 18 causes large Barkhausen effects to be generated in magnetic layers 12,14 which are detected by detector 20. The level of the physical condition is a function of the time required for the large Barkhausen effect to occur in the different magnetic layers 12,14. The level of the physical condition is calculated by comparing the time difference required for the large Barkhausen effect to take place in magnetic layers 12,14 with time differences measured while using magnetic layers similarly formed on a calibration object subjected to known levels of the physical condition.

24 Claims, 2 Drawing Figures

CONTACT-FREE, MAGNETIC, STRESS AND TEMPERATURE SENSOR

BACKGROUND OF THE INVENTION

1. Field of the Invention

The present invention is directed to a contact-free, magnetic detection method and means for measuring physical conditions, such as stress and temperature, affecting an object. Any physical condition which affects a change in the magnetic properties of ferromagnetic materials can be measured.

2. Description of the Prior Art

It is well known that the magnetization of a ferromagnetic material changes in discrete pulses, rather than continuously, as a function of an applied magnetic field. This phenomenon is known as a Barkhausen effect (or small Barkhausen effect), and it is evidenced by small clicks (i.e., Barkhausen noise) when the magnetic domains of a ferromagnetic material are switched as a result of an applied magnetic field. The small Barkhausen effect may be amplified if the domains of the magnetic material are predominantly aligned before the magnetic field is applied. When the domains are predominantly aligned there is an abrupt switching in the magnetization of the magnetic material at a certain threshold magnetic field. This is known as a large Barkhausen effect. An example of the large Barkhausen effect is described, for example, in an article entitled "Weigand Wire: New Material for Magnetic-Devices", which appeared in ELECTRONICS MAGAZINE, July 10, 1975, on pages 100–105.

Methods utilizing both the large Barkhausen effect and the small Barkhausen effect have been developed. For example, U.S. Pat. No. 3,427,872 issued to R. W. Leep and R. L. Pasley employs a first coil and/or magneto-coil element to induce magnetization into the test specimen and uses a second coil means for detecting Barkhausen noise (i.e. a small Barkhausen effect) as the magnetization in the specimen is varied. Problems arise with devices such as the Leep device which detect Barkhausen noise because the level of signal obtainable from these devices is too faint and the response time is too slow to give meaningful analysis of stress and/or torque in rapidly rotating shafts or the like.

U.S. Pat. No. 4,416,161 issued to S. Barkhoudarian discloses a torque-measuring apparatus which utilizes a Wiegand device mounted on a rotating shaft. A large Barkhausen effect is generated when a magnetic field is generated in the vicinity of the loaded shaft. The Barkhoudarian device determines the torque on the shaft by measurement of either the large Barkhausen effect pulse width or amplitude.

Inherent difficulties result from using the measurement of pulse width or amplitude to characterize the stress on the shaft because these parameters, in addition to varying as a function of torque, also vary as a function of the shaft speed. Hence, measurements using these parameters are excellent if the speed of the shaft remains constant, but are very difficult to make if the speed of the shaft changes during the test. The correction for speed is non-linear, making calculations of torque very difficult.

SUMMARY OF THE INVENTION

The present invention provides a method and means for measuring the stress, or other physical conditions, such as torque, temperature, or strain, on a stationary or rotating test object by utilizing detection of the large Barkhausen effect.

In the preferred embodiment, two thin layers of different ferromagnetic materials are adhesively formed on the surface of the test object.

Prior to testing, an easy axis of magnetization is formed for each magnetic layer. The easy axis causes the magnetic domains of each layer to tend to self-align parallel or anti-parallel to a certain direction. The easy axis may be formed by any convenient method including prestressing the layer, forming the layer in a very thin and narrow dimension, or depositing the layer in the presence of a biasing magnetic field.

In the case of a stationary test object, after the domains are predominantly aligned and the object is brought to its operating mode, the layers are subjected to an alternating, time-varying magnetic field such as a field created by an AC coil.

Resultant abrupt domain reversals, which are indications of the large Barkhausen effect, take place at a different time for each magnetic layer because the layers are formed of different materials. The stress on the test object, or other physical condition being studied, is measured as a function of the time difference between these domain reversals. By comparing this time difference with values obtained by calibration tests made with similar layers formed under the same conditions with known stresses, the stress on the test object may be determined.

In the case of a rotating object, the test setup is slightly different. Two magnets are utilized to trigger the domain reversals. The magnets are located at positions in the vicinity of the shaft so that as the shaft rotates the layers are subjected to the magnetic field of one of the magnets which causes the domains to align in one direction. As the shaft continues to rotate, the layers are subjected to the field of the second magnet, polarized in the opposite direction from the first magnet. Thus, the magnetic domains are reversed and reset for every period of the rotating shaft. Calculations of stress, by determining the time differences between domains reversals and comparing this value with values from calibration tests, are made as in the stationary embodiment. Other physical conditions, in addition to stress, such as temperature, may affect a material's response to a magnetic field. Different physical conditions may be determined by carefully selecting layers which are composed of materials which are magnetically responsive to the physical condition disired to be tested.

OBJECTS OF THE INVENTION

An object of the invention is, therefore, to obtain precise measurements of the applied stress upon test objects by a magnetic field detection method.

Another object of the present invention is to measure stress on an object, in a non-destructive, contact-free manner, while the object is in its customary environment and loaded in its customary manner.

Still another use of the present invention is to provide precise measurements of other physical conditions, such as temperature, on test objects.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawing are designated by the same reference characters, while equivalent elements bear a prime designation.

DETAILED DESCRIPTION OF THE PREFERRED EMBODIMENTS

Figure 1:
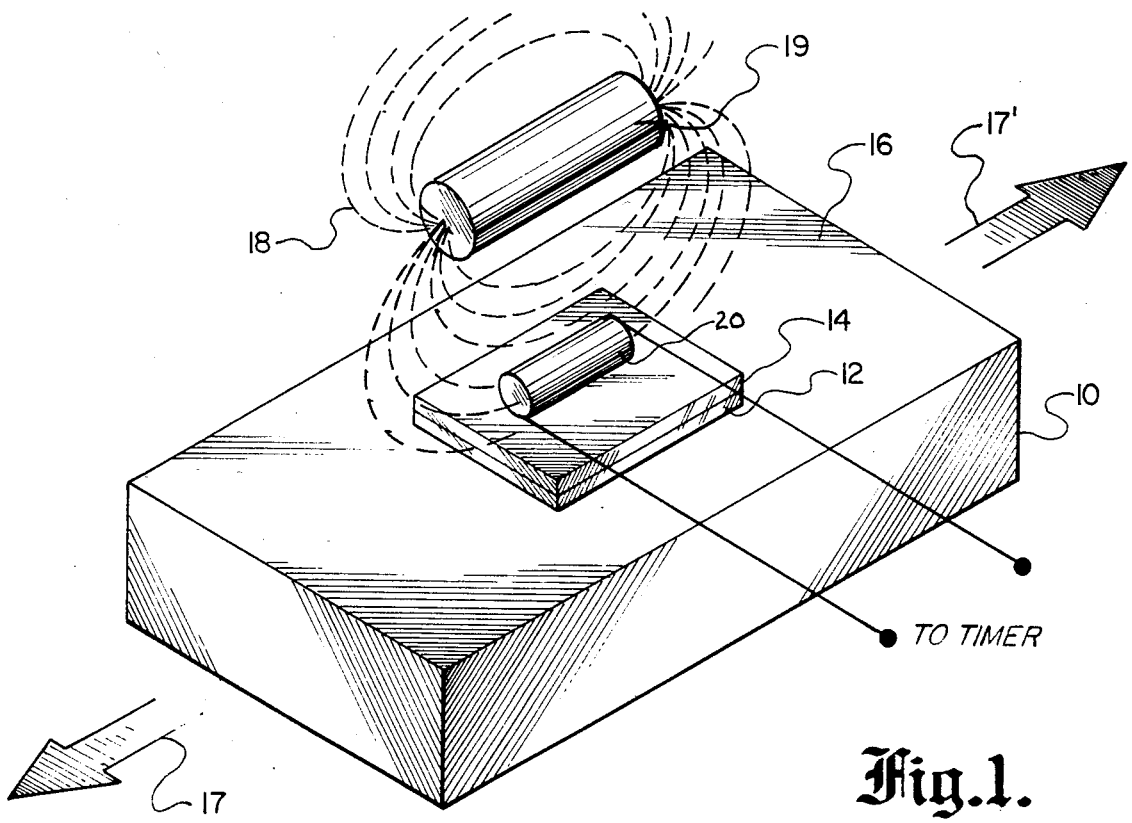
FIG. 1 is a schematic illustration of an embodiment of the non-contacting stress sensor for measuring the physical condition on a stationary test object.

Referring to the drawings and to the characters of reference marked thereon, FIG. 1 illustrates the apparatus adopted to measure stress and other physical conditions, such as stress and temperature, affecting stationary non-ferromagnetic test object 10. The discussion below will primarily be directed toward measuring stress; however, as more fully discussed below, the apparatus may be easily adapted for measuring temperature and other physical conditions.

Two or more thin layers 12,14 of different ferromagnetic materials are formed onto the surface 16 of test object 10. By way of example but not limitation, thin layers 12,14 may be comprised of nickel, cobalt, iron, rare earth elements, and alloys of the above. These thin layers may be deposited or adhered directly onto test object 10 by glue, vacuum deposit, ion implanting, plating, painting or other adhesive means; or they may be attached to test object 10 via a film gage which contains them. In any case, thin layers 12,14 must be thin enough and adhered sufficiently so that any change in the physical condition of the test object induces a correlative change in that condition in thin layers 12,14. Optimally, layers 12,14 should be in the order of about 0.001 inches thick.

Prior to testing the object, regardless of the physical condition being monitored, it is required that an easy axis of magnetization be formed for each thin layer 12,14. Formation of an easy axis causes the magnetic domains to tend to self-align parallel or antiparallel to a given direction, thus making the thin layers 12,14 amenable to the large Barkhausen effect. Whether the domains are parallel or antiparallel depends upon the direction of the magnetic field to which thin layers 12,14 have most recently been exposed. Once thin layers 12,14 have had an easy axis of magnetization induced, they become magnetized and are denoted as magnetic layers 12,14.

There are numerous ways in which an easy axis may be formed; some of these methods are listed below;

1. Stressing the thin layer before or after it is deposited on or attached to the test object, for example, prestressing the test object, depositing the materials, and then releasing the test object, thus leaving the deposits in a stressed condition.
2. It is well known that the geometry of a material affects its magnetization. Forming a very narrow, thin layer will create a natural easy axis.
3. Deposition of the layer in the presence of a station, biasing magnetic field results in the formation of an easy axis.

After the magnetic layers 12,14 are formed on test object 10, the test object may be subjected to the physical condition being monitored. In FIG. 1, test object 10 is stationary and, along with magnetic layers 12,14, is being stressed, as illustrated by arrows 17,17'. As stationary object 10 is being stressed, magnetic layers 12,14 are subjected to a magnetic field 18 which causes abrupt magnetic domain reversals (i.e. large Barkhausen effects) in each layer at particular threshold magnetic fields. An alternating time-varying field 18 is preferably employed to easily obtain a multitude of detections at each level of the physical condition being monitored. The source 19 of the alternating time-varying magnetic field 18 may be an AC coil, a set of rotating magnets, or any magnets that are in motion so that there is a resultant magnetic field. The large Barkhausen effect occurs within each magnetic layer 12,14 at a certain threshold level of each half-cycle of alternating magnetic field 18.

The layers 12,14 are selected so that they each have different threshold levels; thus, reaching their threshold levels at different times while under the influence of the time-varying magnetic field 18. The threshold level, in addition to being a function of the material composition, is also a function of the strain in the material and therefore can, as described below, be used to determine the stress applied to a material. The large Barkhausen effect can be detected by any detector 20 capable of detecting a time-varying magnetic field such as a magnetic pickup coil, Hall probe, or a fiberoptic magnetic sensor. Each large Barkhausen effect appears as a pulse on detector 20 which is on the order of 100 microseconds long, and therefore can be easily separated from the other effects of the slow time-varying field 18 by conventional electronic filtering.

To calculate the stress on a test object, a calibration test is required. For the calibration, layers of magnetic material of the same composition and dimensions as the layers contemplated to be used during the actual test are adhered to a calibration test object in the same manner contemplated for the actual test object 10. In addition, an easy axis is formed, as explained above, in the same manner anticipated for the actual test object 10. It is important that the magnetic layers 12,14 for the calibration test be oriented in the same direction as the magnetic layers 12,14 in the actual test. Known stresses and a magnetic field are applied to the calibration test object 10. The times of the detected resultant large Barkhausen effect in magnetic layers 12,14 are recorded for a plurality of known stresses and the differences in the times, $\Delta t$, at which the layer Barkhausen effects take place in the magnetic layers 12,14 are determined. Calibration plots of stress, $\sigma$, as a function of the time between the large Barkhausen effects, $\Delta t$, can then be formulated; i.e., $\sigma = f(\Delta t)$. The test object 10 cannot be made of a ferromagnetic material. To use a ferromagnetic material in this instance would create a short circulating of the magnetic circuit. By way of example but not limitation, test object 10 may be comprised of stainless steel, copper, brass, aluminum, Inconel, Waspalloy, and non-metallic structural materials such as plastic or glass.

During the actual stress test, magnetic layers 12,14 are first formed as in the calibration test. When magnetic field 18 is introduced, the time difference between detected large Barkhausen effects is determined and compared to the plotted calibration test to provide an indication of stress.

If magnetic field 18 has a changing frequency then the same method as above may be utilized; however, the stress in the calibration test is determined as a function of the ratio of the time difference between large Barkhausen effects, Δt, to the period, T, of magnetic field 18, i.e., $\sigma = f(\Delta t/T)$.

Figure 2:
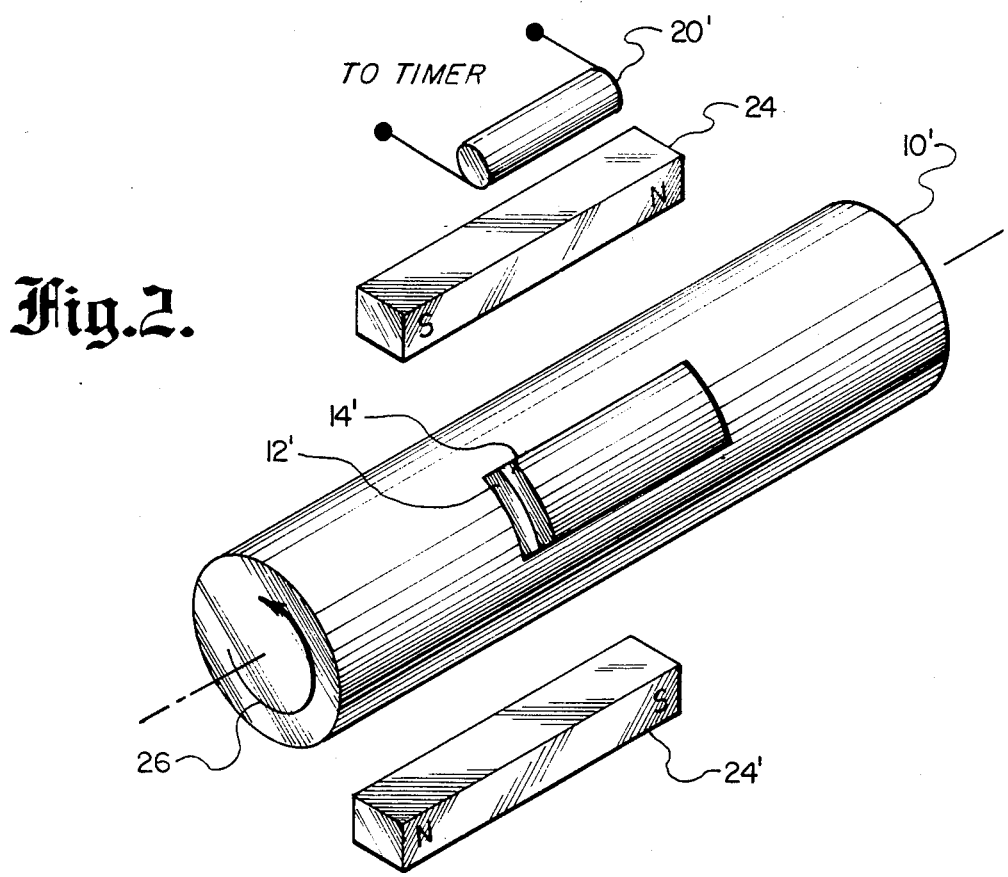
FIG. 2 is a schmeatic illustration of an embodiment of the non-contacting sensor for measuring the physical condition on a rotating test object.

The present invention may also be utilized to determine the value of a physical condition, such as torque, affecting a rotating shaft. The preferred method of obtaining these measurements is illustrated in FIG. 2. Magnetic layers 12′,14′ are formed, as in the stationary case, by deposition or by attaching them to shaft 10′. In the present instance, however, stress measurements are preferably accomplished by reversing the magnetic domains (i.e. generating large Barkhausen effects) with a permanent magnet or an electromagnet denoted at 24, located in the vicinity of the shaft 10′.

As magnetic layers 12′,14′ are rotating in the direction shown by arrow 26, the domains are magnetized in one direction by magnet 24′. Continued rotation toward second magnet 24, which is in the vicinity of detector 20′ and whose magnetic poles are oriented in the opposite direction to those of first magnetic 24′, simulates the varying magnetic field 19 described for the stationary embodiment. The large Barkhausen effect is detected, as in the stationary method by a magnetic field detector 20′, such as a pickup coil, Hall probe, or a fiberoptic magnetic sensor.

The procedure for determining torque on rotating shaft 10′ is similar to that outlined above, i.e., a calibration test is made to determine torque as a function of the time between domain reversals of magnetic layers 12′,14′. If the speed of the shaft is varying, stress calculations may be made by using the ratio of the difference between large Barkhausen effects, Δt, to the period, $T_s$, of the rotating shaft as the strain dependent parameter, i.e., $\sigma = f(\Delta t/T_s)$.

As noted, the present invention, as described in either its stationary embodiment or rotating embodiment, can be utilized to measure physical conditions other than stress. The physical condition measured by the sensor must be a condition that influences the time response of magnetic layers 12,14 to a magnetic field. For example, temperature can be measured by the present invention because magnetic material for magnetic layers 12,14 can be selected which will experience the large Barkhausen effect at different times depending on their temperatures.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A contact-free method of determining the physical condition on a non-ferromagnetic object which comprises the steps of:
    subjecting the object having at least two magnetic layers, wherein each magnetic layer is a different ferromagnetic material each having an easy axis of magnetization, to a physical condition which influences the time reponse of each magnetic layer to a magnetic field;
    subjecting said magnetic layers to a magnetic field whereby a large Barkhausen effect is generated in each of said magnetic layers;
    detecting the large Barkhausen effect within each of said magnetic layers;
    measuring the difference in the times, Δt, at which said large Barkhausen effects take place in said magnetic layers; and
    determining the physical condition of the object by comparing said time difference with time differences measured while using magnetic layers similarly formed on a calibration object subjected to known levels of said physical condition.

2. The method as described in claim 1 wherein the physical condition being determined is stress.

3. The method as described in claim 1 wherein the physical condition being determined is temperature.

4. The method as described in claim 1 wherein said easy axis is formed by prestressing the object, depositing the magnetic materials onto the object, and then releasing the object.

5. The method as described in claim 1 wherein the easy axis and magnetic layers are formed by depositing the magnetic material onto the object in the presence of a static, biasing magnetic field.

6. The method of claim 1 wherein two magnetic layers of magnetic material are formed on the object.

7. The method of claim 1 wherein the large Barkhausen effect is detected by a pickup coil.

8. The method of claim 1 wherein said magnetic layers are formed by attaching them to the object via a film gage which contains them.

9. The method as described in claim 1 wherein the object is stationary and said magnetic field is an alternating, time-varying magnetic field having a period, T.

10. The method as described in claim 9 wherein the determination of physical condition is made by taking the ratio of the time difference, Δt, to the period, T, of the time-varying magnetic field, i.e., Δt/T, and comparing this ratio to ratios determined while using magnetic layers similarly formed on a calibration object subjected to known levels of said physical condition.

11. The method of claim 1 wherein the object is a rotatable shaft with period $T_s$, and wherein the method of subjecting said magnetic layers to a magnetic field comprises the steps of:
    rotating said magnetic layers through a first magnetic field for aligning the magnetic domains of the magnetic layers in a first direction along the easy axis; and
    rotating said magnetic layers through a second magnetic field for reversing said magnetic domains.

12. The method of claim 11 wherein the physical condition being determined is torque.

13. The method of claim 11 wherein said magnetic fields are generated by two permanent magnets with oppositely-oriented poles.

14. The method of claim 11 wherein said magnetic fields are generated by two electromagnets with oppositely-oriented poles.

15. The method of claim 11 wherein the determination of physical condition is made by taking the ratio of the time difference, Δt, to the period, $T_s$, of rotation of the shaft, i.e., $\Delta t/T_s$, and comparing this ratio to ratios determined while using layers similarly formed on a calibration object subjected to known levels of said physical condition.

16. A contact-free method of determining the stress on a non-ferromagnetic stationary object comprising the steps of:
    stressing the object having at least two magnetic layers, wherein each magnetic layer is a different ferromagnetic material each having an easy axis of magnetization;
    subjecting said magnetic layers to an alternating, time-varying magnetic field whereby a large Barkhausen effect takes place within each of said magnetic layers;

detecting the large Barkhausen effect within each of said magnetic layers;

measuring the difference in the times at which said large Barkhausen effects take place in said magnetic layers; and determining the physical condition of the object by comparing said time difference with time differences measured while using magnetic layers similarly formed on a calibration object subjected to known levels of stress.

17. A contact-free method of determining the torque on a non-ferromagnetic rotatable shaft which comprises the steps of:

subjecting the object having at least two magnetic layers, wherein each magnetic layer is a different ferromagnetic material each having an easy axis of magnetization, to a torque;

rotating said magnetic layers through a first magnetic field for aligning the magnetic domains of the magnetic layers in a first direction on the easy axis;

rotating said magnetic layers through a second magnetic field whereby a large Barkhausen effect takes place within each of said magnetic layers;

detecting the large Barkhausen effect within each of said magnetic layers;

measuring the difference in the times at which said large Barkhausen effects take place in said magnetic layers; and determining the torque on the shaft by comparing said time difference with time differences measured while using magnetic layers similarly formed on a calibration object subjected to known levels of torque.

18. A contact-free sensor for determining physical conditions comprising:

a non-ferromagnetic object;

at least two magnetic layers formed on said object, wherein each of said magnetic layers is a different ferromagnetic material such having an easy axis of magnetization;

means for subjecting said magnetic layers to a magnetic field for generating a large Barkhausen effect in each of said magnetic layers;

detection means for detecting the large Barkhausen effect within each of said layers;

means associated with said detector for measuring the difference in the times at which said Barkhausen effects take place in said magnetic layers and for determining the physical condition of the object by comparing said time difference with time differences measured while using magnetic layers similarly formed on a calibration object subjected to known levels of said physical condition.

19. The contact-free sensor of claim 18 wherein the physical condition being determined is stress.

20. The contact-free sensor of claim 18 wherein the physical condition being determined is temperature.

21. The sensor of claim 18 wherein the object is stationary and wherein said magnetic field is produced by an alternating, time-varying, magnetic source.

22. The contact-free sensor of claim 18 wherein the object is a rotatable shaft and said means for subjecting said magnetic layers to a magnetic field comprise:

a first magnet in the vicinity of the shaft for generating a magnetic field to align the magnetic domains of said magnetic layers in a first direction on the easy axis; and a second magnet in the vicinity of the shaft, with poles oriented in opposite directions from said first magnet for generating a large Barkhausen effect in said magnetic layers.

23. The contact-free sensor of claim 22 wherein the physical condition being determined is torque.

24. The contact-free sensor of claim 22 wherein the physical condition being determined is temperature.

* * * * *